United States Patent Office 2,916,106
Patented Dec. 8, 1959

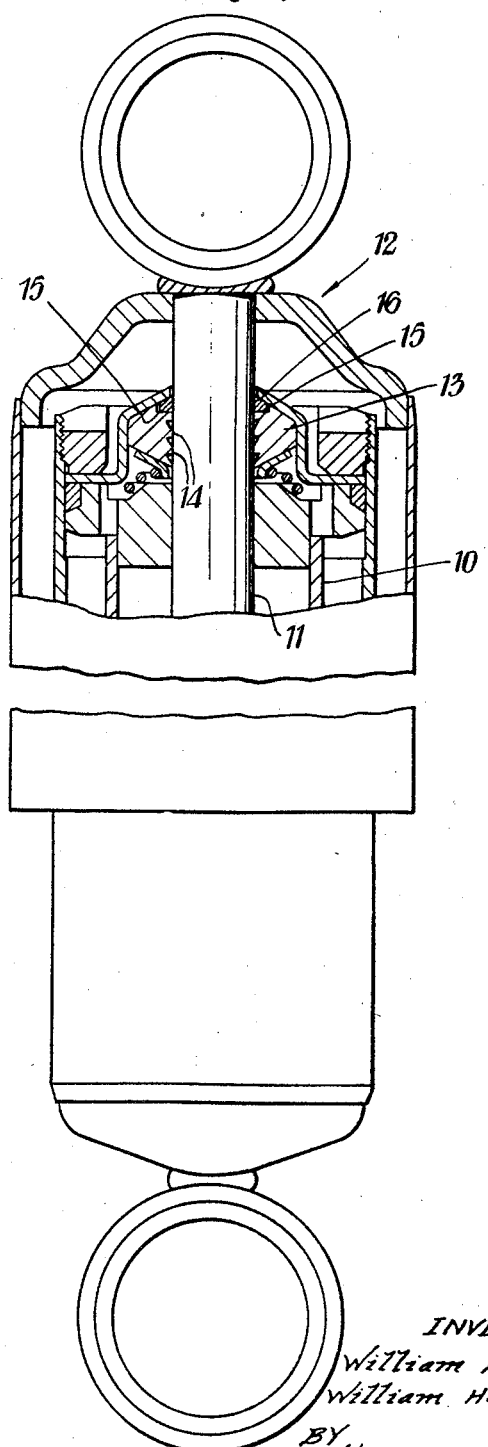

2,916,106

LUBRICATING SEAL FOR SHOCK ABSORBERS

William Arthur Duckett, Ossett, and William Henry Lloyd, Castleford, England, assignors, by mesne assignments, to Woodhead-Monroe Limited, Leeds, England, a British company Application August 3, 1955, Serial No. 526,278

Claims priority, application Great Britain August 3, 1954

4 Claims. (Cl. 188—100)

This invention relates to lubricant sealing devices adapted to be employed on or around shafts, reciprocatory rods or the like to prevent leakage of lubricant along such shafts, rods or the like.

In shock absorbers of the telescopic hydraulic type it has been the practice hitherto to incorporate in the closure assembly at the upper end of the cylinder a sealing ring of rubber or other similar material which is adapted to cooperate with the piston rod to prevent leakage of oil along the latter. Such known sealing rings are commonly provided on their inner surface with a plurality of inwardly directed annular ribs, lips or the like which are adapted actually to engage the piston rod and to exert a wiping action thereon. It has been found, however, that by reason of the provision of a plurality of such wiping ribs, lips or the like the molecular oil film which is present on the piston rod and serves to lubricate the seal is often wiped from said rod before any oil can reach those ribs, lips or the like which are furthest away from the oil supply in the shock absorber. Since certain of the ribs, lips or the like are not lubricated the coefficient of friction between the seal and the piston rod is increased so that wear takes place more rapidly on said seal while the latter also tends to vibrate and to cause a noise in the shock absorber which noise is generally of comparatively low frequency and is commonly referred to as "grunt."

It is the chief object of the invention to provide means whereby the difficulty indicated above may be simply and effectively overcome.

According to the invention in an annular sealing device adapted to cooperate with a shaft, rod or the like and incorporating a plurality of wiping lips, teeth or the like designed to make wiping contact with the surface of such shaft, rod or the like, means are provided adapted to constitute a lubricant reservoir which will ensure that the wiping lips, teeth or the like which are in contact with the shaft, rod or the like will not become dry. Preferably the means will comprise an auxiliary bearing ring or the like of porous material adapted to be impregnated with a lubricant such ring being disposed within an annular recess formed in the outer face of the sealing device.

In order that the said invention may be clearly understood and readily carried into effect the same will be hereinafter more fully described with reference to the accompanying drawing which shows partly in section a hydraulic telescopic shock absorber incorporating a sealing device the latter also being shown in section.

Referring now to the drawing the hydraulic telescopic shock absorber therein illustrated is of known type and includes a main cylinder 10 in which a piston (not shown) is adapted to slide such piston being carried by a piston rod 11 to which one of the anchors of the shock absorber is attached. As is usual the upper end of the cylinder is closed by means of a closure assembly designated generally by 12 such assembly incorporating a sealing ring 13 which is adapted to cooperate with the piston rod 11. The sealing ring 13 is, as has been the practice hitherto, provided on its inner surface with a plurality of inwardly directed annular lips, teeth or the like 14 adapted to engage the piston rod 11 but in addition the upper face of the sealing ring, i.e. that face remote from the oil supply in the shock absorber is formed with an annular recess 15 adapted to accommodate a bearing ring 16, the latter being formed of porous material and impregnated with lubricant. The bearing ring 15 surrounds the piston rod 11 and by virtue of its impregnation with lubricant forms a lubricant reservoir which ensures that the uppermost wiping lips, teeth or the like 14 on the seal will not become dry. By reason of the fact that the bearing ring 16 is seated in a recess within the sealing ring 13 the overall dimensions of the latter will not be increased so that said sealing ring may be employed in any existing shock absorber assembly without any major modification being necessary to existing parts of such assembly.

Although the device of the present invention is particularly adapted for application to shock absorbers it will be appreciated that it may be incorporated in any sealing device in which similar problems have hitherto been encountered.

We claim:

1. A sealing member for slidably engaging a reciprocating rod to prevent the escape of fluid around the rod comprising an annular resin sealing ring having at least three annular wiping ribs projecting radially inwardly from the inner surface thereof, and a ring of lubricant retaining material impregnated with a lubricant fastened to one end of said sealing ring in coaxial alignment therewith.

2. A sealing member for slidably engaging a reciprocating rod to prevent the escape of fluid around the rod comprising an annular resin sealing ring having at least three annular wiping ribs projecting radially inwardly from the inner surface thereof, and a porous bearing ring impregnated with lubricant fastened to one end of said sealing ring in coaxial alignment therewith.

3. A sealing member for slidably engaging a reciprocating rod to prevent the escape of fluid around the rod comprising an annular resin sealing ring having at least three annular wiping ribs projecting radially inwardly from the inner surface thereof and an annular recess in one end thereof, and a porous bearing ring impregnated with lubricant secured within said annular recess in coaxial alignment with said sealing ring.

4. In a hydraulic shock absorber having a cylinder for retaining shock absorbing fluid and a piston rod slidably mounted on one end of said cylinder for reciprocation into and out of the cylinder, an annular resin sealing ring disposed over said rod and fastened to said one end of said cylinder, said sealing ring having at least three annular wiping ribs projecting radially inwardly from the inner surface thereof and slidably engaging said rod to prevent fluid within said cylinder from escaping around the rod, and lubricant retaining ring means fastened to the end of said sealing ring furthest removed from said cylinder and slidably engaging said rod to provide a coating of lubricant thereon for lubricating the wiping ribs adjacent said lubricant retaining means on the return stroke of the rod.

References Cited in the file of this patent

UNITED STATES PATENTS

| 1,873,146 | Patch | Aug. 23, 1932 |
| 2,001,614 | Johnson | May 14, 1935 |
| 2,177,441 | Pesarese | Oct. 24, 1939 |
| 2,468,285 | Bausman | Apr. 26, 1949 |
| 2,518,338 | Lampe | Aug. 8, 1950 |
| 2,737,384 | Laugaudin | Mar. 6, 1956 |
| 2,753,958 | Whisler | July 10, 1956 |

FOREIGN PATENTS

| 1,073,901 | France | Mar. 31, 1954 |